United States Patent
Bhatia et al.

(10) Patent No.: US 12,093,355 B2
(45) Date of Patent: Sep. 17, 2024

(54) SECURE DATA TRANSFER IN A VIRTUAL ENVIRONMENT USING BLOCKCHAIN

(71) Applicant: Bank of America Corporation, Charlotte, NC (US)

(72) Inventors: Sheetal Bhatia, Mumbai (IN); Sandeep Kumar Chauhan, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 253 days.

(21) Appl. No.: 17/930,242

(22) Filed: Sep. 7, 2022

(65) Prior Publication Data

US 2024/0078297 A1    Mar. 7, 2024

(51) Int. Cl.
*G06F 21/31*      (2013.01)
*G06F 3/01*      (2006.01)
*H04L 67/306*    (2022.01)

(52) U.S. Cl.
CPC .............. *G06F 21/31* (2013.01); *G06F 3/011* (2013.01); *H04L 67/306* (2013.01)

(58) Field of Classification Search
None
See application file for complete search history.

(56) References Cited

U.S. PATENT DOCUMENTS

| | | |
|---|---|---|
| 7,788,473 B1 * | 8/2010 | Nelson .................. G06F 9/3832 712/225 |
| 8,812,876 B1 | 8/2014 | Ginzton et al. |
| 8,839,455 B1 | 9/2014 | Tormasov |
| 9,317,316 B2 | 4/2016 | Liu |
| 9,489,534 B2 | 11/2016 | Hashii et al. |
| 9,558,081 B2 | 1/2017 | Borthakur et al. |
| 9,575,790 B2 | 2/2017 | Tosa et al. |
| 9,667,606 B2 | 5/2017 | Birger et al. |
| 9,722,977 B2 | 8/2017 | Hars |
| 9,767,070 B2 | 9/2017 | Chang et al. |
| 9,892,265 B1 | 2/2018 | Tripathy et al. |
| 10,061,928 B2 | 8/2018 | Wang et al. |
| 10,073,977 B2 | 9/2018 | Pappachan et al. |
| 10,911,225 B2 | 2/2021 | Bunch et al. |
| 10,970,410 B2 | 4/2021 | Barnes et al. |
| 11,042,657 B2 | 6/2021 | Hausauer et al. |
| 11,138,133 B2 | 10/2021 | Khosravi et al. |
| 2008/0107261 A1 | 5/2008 | Kistner |
| 2008/0235581 A1 * | 9/2008 | Caporale ................ G06N 20/00 715/706 |

(Continued)

*Primary Examiner* — William J. Goodchild

(57) ABSTRACT

A system for secure data transfer in a virtual environment receives a request to initiate a virtual interaction session between an avatar and an entity within the virtual environment. The avatar is operated by a user using a user device. The system presents a virtual data reader to the avatar. The virtual data reader comprises a screen to display data. The system receives user input from the user device. The user input includes user information and data object to be transferred to the entity. The user input is transferred from the user input to the virtual data reader. The system receives a security token from the avatar. The system verifies that the user input belongs to the user. The system also determines that the security token is valid. In response, the system transfers the data object to the entity and concludes the virtual interaction session.

20 Claims, 4 Drawing Sheets

(56) References Cited

U.S. PATENT DOCUMENTS

| | | | |
|---|---|---|---|
| 2014/0041055 A1* | 2/2014 | Shaffer | G06F 21/604 |
| | | | 726/28 |
| 2017/0227995 A1* | 8/2017 | Lee | G06N 20/00 |
| 2017/0277898 A1 | 9/2017 | Powell et al. | |
| 2018/0101771 A1* | 4/2018 | Schwarm | G06N 20/00 |
| 2018/0107608 A1 | 4/2018 | Kaplan et al. | |
| 2019/0303943 A1* | 10/2019 | Zhang | G06N 3/047 |
| 2020/0059363 A1* | 2/2020 | Lobo | G07G 3/00 |
| 2020/0184048 A1* | 6/2020 | Toth | G06F 21/6218 |
| 2022/0191176 A1 | 6/2022 | Binder | |

* cited by examiner

SECURE DATA TRANSFER IN A VIRTUAL ENVIRONMENT USING BLOCKCHAIN

TECHNICAL FIELD

The present disclosure relates generally to cryptography and security, and more specifically to secure data transfer in a virtual environment using blockchain.

BACKGROUND

Users can operate avatars to perform all kinds of actions in a virtual environment. For example, a user may operate their avatar to transfer an object to another avatar associated with another user. In data transmission in the virtual environment, data is exposed to bad actors and cyberattacks. It is challenging to transmit data in the virtual environment without the data being exposed to bad actors and cyberattacks.

SUMMARY

The system described in the present disclosure is particularly integrated into a practical application of improving the security of data transfer operations among entities and avatars in virtual environments. By improving the security of data transfer operations among entities in virtual environments, profiles of the entities and avatars, and data stored in the profiles are kept secured from unauthorized access. For example, if a bad actor impersonates a user and operates the user's avatar in a virtual environment to transfer data objects, virtual objects, services, etc. to themselves, the disclosed system is configured to detect that the bad actor impersonating the user and deny the data transfer request from the bad actor. For verifying the identity of the user initiating a data transfer in a virtual environment, the disclosed system is configured to combine information received from the user (in the real-world) and information received from an avatar associated with the user (in the virtual environment). For example, the disclosed system is configured to combine and validate user information received from the user in the real world with a security token (that only the user knows) received from the user's avatar in the virtual environment. Thus, a bad actor would have to alter or spoof both information received from the real world and the virtual environment in order to impersonate the user's avatar to transfer data objects to themselves or any other entity. This increases the spoofing complexity for the bad actor, which makes conducting an unauthorized data transfer difficult. This leads to minimizing (or preventing) unauthorized data transfers in virtual environments.

In one embodiment, a system for secure data transfer in a virtual environment comprises a memory and a processor. The memory is configured to store a user profile associated with a user. The user profile comprises first user information comprising at least one of a first name and a first identifier number and first security token that is used to authenticate the first user information. The processor is operably coupled with the memory. The processor is configured to receive a request to initiate a virtual interaction session between an avatar and an entity within a virtual environment, wherein the avatar is operated by the user using a user device. The processor presents a virtual data reader to the avatar, wherein the virtual data reader comprises a screen to display data. The processor receives a user input from the user device. The user input comprises second user information and data object to be transferred to the entity. The second user information comprises at least one of a second name and a second identifier number. The user input is transferred from the user device to the virtual data reader. The processor receives a second security token from the avatar. The processor verifies that the user input belongs to the user. The processor verifies that the second security token is valid. In response to determining that the user input belongs to the user and that the second security token is valid, the processor transfers the data object to the entity. The processor concludes the virtual interaction session.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions to provide secure data transfer in virtual environments. Embodiments of the present disclosure and its advantages may be understood by referring to FIGS. 1 through 4. FIGS. 1 through 4 are used to describe systems and methods for provisioning secure data transfer in virtual environments.

System Overview

Figure 1:
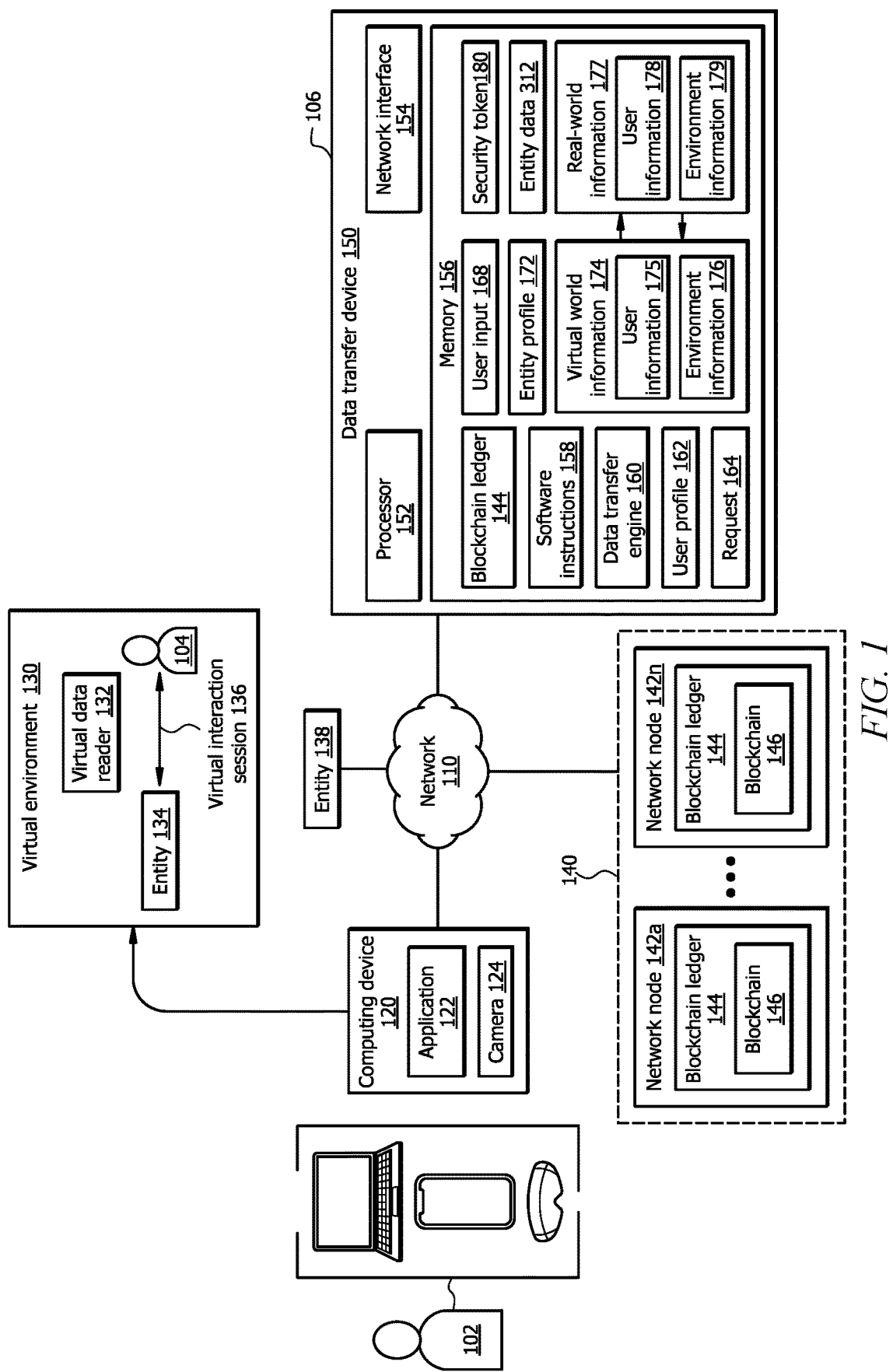
FIG. 1 illustrates an embodiment of a system configured to provide secure data transfer in virtual environments.

FIG. 1 illustrates an embodiment of a system 100 that is configured to provide secure data transfer in virtual environments 130. In certain embodiments, the system 100 comprises a data transfer device 150 communicatively coupled with a computing device 120 and a blockchain network 140 via a network 110. Network 110 enables communication among the components of the system 100. The data transfer device 150 comprises a processor 152 in signal communication with a memory 156. Memory 156 stores software instructions 158 that when executed by the processor 152 cause the data transfer device 150 to perform one or more operations described herein. For example, when the software instructions 158 are executed, the data transfer device 150 executes a data transfer engine 160 that triggers the secure data transfer operation in a virtual interaction session 136 between an avatar 104 and an entity 134. In other embodiments, system 100 may not have all of the components listed and/or may have other elements instead of, or in addition to, those listed above.

In certain embodiments, data transfer information comprising receiving entities, sending entities, data objects being transferred, etc. may be distributed in a blockchain network 140. Therefore, data transfer may be authenticated by a plurality of network nodes 142*a-n*. This improves the security of data transfer operations in virtual environments 130.

In certain embodiments, the identity of the user 102 operating the avatar 104 and the identity of the entity 134 may be determined and verified before allowing the data transfer operation between the avatar 104 and the entity 134. Accordingly, the system 100 is integrated into a practical application of improving the security of data transfer operations in virtual environments 130. By improving the security of data transfer operations among entities and avatars in virtual environments 130, profiles of the entities and avatars, and data stored in the profiles are kept secured from unauthorized access. For example, if a bad actor impersonates a user and operates a user's avatar in a virtual environment to transfer data objects (e.g., to themselves or another entity), the system 100 is configured to detect that the bad actor is impersonating the user and prevent the data transfer to occur. For verifying the identity of the user 102 initiating a data transfer in a virtual environment, the system 100 is configured to combine information received from the user 102 (in the real-world) and information received from an avatar 104 of the user 102 (in the virtual environment 130). Thus, a bad actor would have to alter or spoof both information received from the real world and the virtual environment 130 in order to impersonate the user's avatar 104 to transfer data objects. This increases the spoofing complexity for the bad actor, which makes conducting an unauthorized data transfer difficult. This leads to minimizing (or preventing) unauthorized data transfers in virtual environments 130.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol as would be appreciated by one of ordinary skill in the art.

Computing Device

A computing device 120 is generally any device that is configured to process data and interact with users 102. Examples of the computing device 120 include, but are not limited to, a personal computer, a desktop computer, a workstation, a server, a laptop, a tablet computer, a mobile phone (such as a smartphone), smart glasses, Virtual Reality (VR) glasses, a virtual reality device, an augmented reality device, an Internet-of-Things (IoT) device, or any other suitable type of device. The computing device 120 may include a user interface, such as a display, a microphone, a camera, keypad, or other appropriate terminal equipment usable by user 102. The computing device 120 may include a hardware processor, memory, and/or circuitry (not explicitly shown) configured to perform any of the functions or actions of the computing device 120 described herein. For example, a software application designed using software code may be stored in the memory and executed by the processor to perform the functions of the computing device 120. The computing device 120 is configured to communicate with other devices and components of the system 100 via the network 110.

The computing device 120 includes and/or operably coupled with one or more cameras 124. The Camera 124 may be or include any camera that is configured to capture images of a field of view in front of the computing device 120 and/or in front of the camera 124. Examples of the camera 124 may include charge-coupled device (CCD) cameras and complementary metal-oxide semiconductor (CMOS) cameras. One camera 124 may be configured to capture images of a user 102 within a real environment. The camera 124 is a hardware device that is configured to capture images continuously, at predetermined intervals, or on-demand. For example, the camera 124 is configured to receive a command from user 102 to capture an image. In another example, the camera 124 is configured to continuously capture images to form a video stream of images. The camera 124 may transmit the captured images and/or video stream to the data transfer device 150. The data transfer device 150 may use the images to identify the user 102 based on a comparison between a received image and a previously provided image of the user 102 in the user information 175, 178. The same or another camera 124 may be configured to capture images of an object (e.g., a file, a document, etc.) that the user 102 wants to take a picture of.

The computing device 120 is configured to display a two-dimensional (2D) or three-dimensional (3D) representation of a virtual environment 130 to a user. Examples of a virtual environment 310 include, but are not limited to, a graphical or virtual representation of a metaverse, a map, a city, a building interior, a landscape, a fictional location, an alternate reality, or any other suitable type of location or environment.

Virtual Environment

A virtual environment 130 may be configured to use realistic or non-realistic physics for the motion of objects within the virtual environment 130. The virtual environment 130 may be maintained by any device, such as the data transfer device 150, a mesh network of computing devices, and the like. For example, some virtual environments 130 may be configured to use gravity whereas other virtual environments 130 may be configured not to use gravity. Within the virtual environment 130, each user 102 may be associated with an avatar 104. An avatar 104 is a graphical representation of the user 102 within the virtual environment 130. Examples of avatars 104 include, but are not limited to, a person, an animal, or an object. In some embodiments, the features and characteristics of the avatar 104 may be customizable and user-defined. For example, the size, shape, color, attire, accessories, or any other suitable type of appearance features may be specified by a user 102. By using an avatar 104, a user 102 is able to move within the virtual environment 130 to interact with other avatars 104, entities, and objects within the virtual environment 130.

Entities 134 may be present at different locations in the virtual environment 130. For example, an entity 134 may be a virtual representation of a physical entity 138 in the virtual environment 130. For example, an entity 134 may be a virtual store, a virtual office, and the like associated with an organization. Likewise, a physical entity 138 may be a physical store, a physical office, and the like associated with the same organization. The entity 134 may provide virtual products and/or services (e.g., resources and data objects) to avatars 104 and users 102. When the user 102 receives a virtual product and/or a service from the entity 134, it may reflect in the real world. The user 102 may want to transfer data objects 166 to the virtual entity 134. This may reflect in the real world. For example, when the data object 166 is transferred from the user 102 (e.g., from the user profile 162 associated with the user 102) to the virtual entity 134, the data object 166 (or an equivalent representation of the data object 166) may be transferred to the physical entity 138 (e.g., to a database associated with physical entity 138). An example of this process is described in more detail below in FIG. 3.

The computing device 120 is further configured to allow a user 102 to send requests and generally communicate with the data transfer device 150. For example, a user 102 may use a computing device 120 to send a request 164 (e.g., a request message) to initiate a virtual interaction session 136 between the avatar 104 and the entity 134. An example of this process is described in more detail below in FIG. 3.

The user 102 may use the computing device 120 to access the application 122. The application 122 may include interfaces that the user 102 can use to operate the avatar 104 in the virtual environment 130. The application 122 may be a web application, a software application, and/or a mobile application. The user 102 is able to login to the application 122 from the computing device 120, access the virtual environment 130, view the representation of the virtual environment 130 on the display of the computing device 120, and operate the avatar 104 (associated with the user 102) in the virtual environment 130.

Blockchain Network

Blockchain network 140 is a peer-to-peer network of network nodes 142a-n, and is generally configured to distribute virtual interaction session data 215 (and any other data/information) among the network nodes 142a-n In certain embodiments, blockchain network 140 is a public blockchain network. In certain embodiments, blockchain network 140 is a private blockchain network. For example, membership in blockchain network 140 may be limited to nodes 142 registered as belonging to and/or affiliated with the organization to which the data transfer device 150 belongs. In certain embodiments, the data transfer device 150 may be a member of blockchain network 140 (e.g., as nodes 142 in blockchain network 140).

Figure 2:
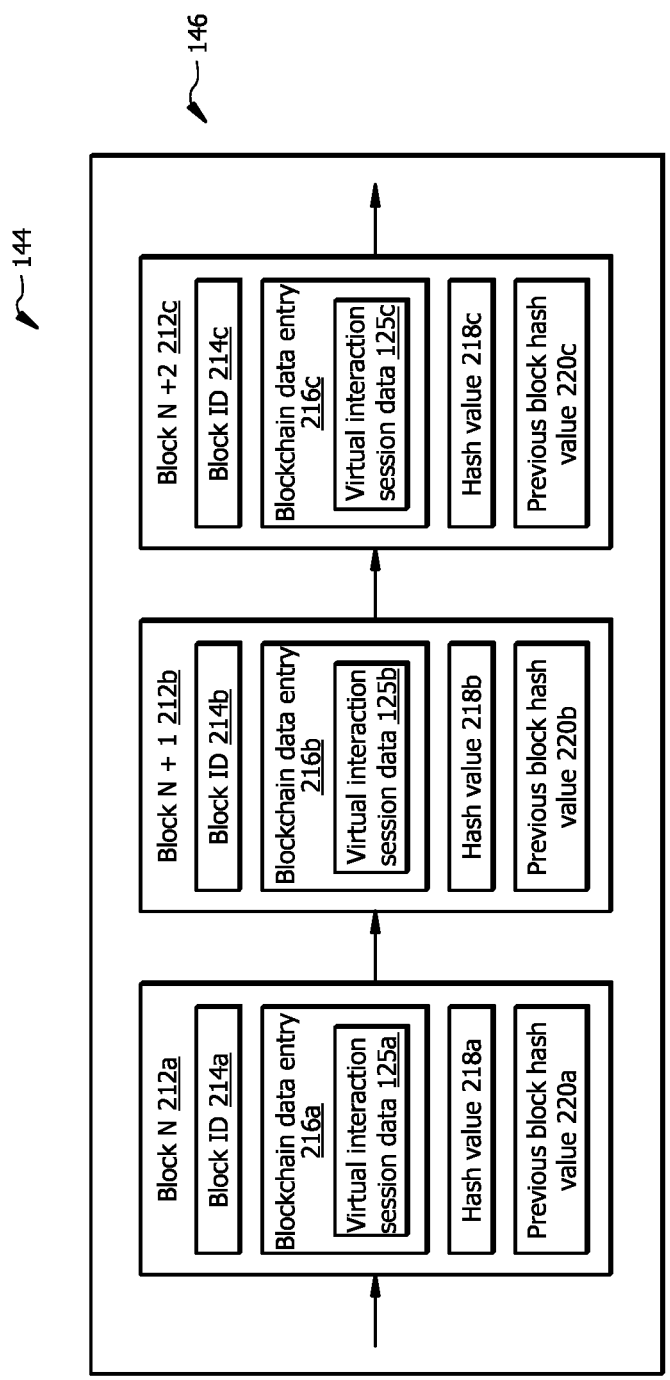
FIG. 2 illustrates an example configuration of a blockchain.

The blockchain network 140 may comprise any number of network nodes 142 to form a distributed network that maintains a blockchain 146 (see also FIG. 2). Each network node 142 may comprise a computing device, a virtual machine, a server, a work station, and/or the like. Each network node 142a through 142n of blockchain network 140 stores a blockchain ledger 144 configured to store a copy of a blockchain 146 (see also FIG. 2).

Each network node 142a through 142n may be an instance of a network node 142. The network node 142 may include a hardware processor, memory, and/or circuitry (not explicitly shown) configured to perform any of the functions or actions of the network node 142 described herein. For example, a software application designed using software code may be stored in the memory and executed by the processor to perform the functions of the network node 142. The network node 142 is configured to communicate with other devices and components of the system 100 via the network 110.

Referring to FIG. 2, the blockchain 146 generally refers to a distributed database shared by a plurality of devices or network nodes 142 in a network. The blockchain ledger 144 stores the blockchain 146. The blockchain 146 comprises blocks 212 which contains every blockchain data entry 216 executed in the network. For example, the blockchain 146 includes a set of blockchain data entries 216a-c executed in blockchain network 140 of FIG. 1.

Blockchain 146 links together blocks 212a-c of data, which store identifiable units called blockchain data entries 216. The blockchain data entry 216 may be interchangeably referred to herein as a blockchain data entry. The blockchain data entries 216a-c, stored in blocks 212a through 212c, may include information, files, and/or any other suitable type of data. For example, blockchain data entries 216a-c may include virtual interaction session data 215a-c received from the data transfer device 150. Each of the virtual interaction session data 215a-c may be associated with a different virtual interaction session 136 (see FIG. 1). A virtual interaction session data 215 may include information about a sending entity (e.g., avatar 104, user input 168, user 102), information about a receiving entity (e.g., entity 134), security token 180, transfer confirmation message 316, data transferred (e.g., data object 166), a timestamp of the data transfer, and/or any other information. The operation of storing and distributing the virtual interaction session data 215a-c in blockchain ledger 144 among the network nodes 142 is described in greater detail in FIG. 3. With every new data transfer (e.g., every new virtual interaction session 136), a new block 212 of data may be generated and added to the blockchain 146.

Each block 212a-c in the blockchain 146 comprises a block identifier (ID) 214a-c and information derived from a preceding block 212a-c. For example, every block 212a-c in the blockchain 146 includes a hash 220a-c of the previous block 212a-c. By including the hash 220a-c, the blockchain 146 comprises a chain of blocks 212a-c from a genesis block 212 (e.g., block 212a or a block before block 212a) to the current block 212c. Each block 212a-c is guaranteed to come after the previous block 212a-c chronologically because the previous block's hash 220a-c would otherwise not be known. In one embodiment, blocks 212a-c in a blockchain 146 may be linked together by identifying a preceding block 212a-c with a cryptographic checksum (e.g. secure hash algorithm (SHA)-256) of its contents (e.g., the virtual interaction session data 215 and additional metadata including block ID 214, hash value 218, and previous block hash value 220) which serves as each block's unique identifier. Links are formed by storing the cryptographic checksum identifier of one block 212a-c in the metadata of another block 212a-c, such that the former block 212a-c becomes the predecessor of the latter block 212a-c. In this way, the blocks 212a-c form a chain that can be navigated from block-to-block by retrieving the cryptographic checksum of a particular block's predecessor from the particular block's own metadata. Each block 212a-c is computationally impractical to modify once it has been in the blockchain because every block 212a-c after it would also have to be regenerated. These features protect data stored in the blockchain 146 from being modified by bad actors which provides information security. When a network node 142 creates an entry (e.g. one or more blockchain data entries 216a-c in a block 212a-c) in its blockchain ledger 144, the blockchain 146 for all other network nodes 142a-n (see FIG. 1) in the distributed network is also updated with the new entry. Thus, data entered in a blockchain 146 is available and accessible to every network node 142a-n (see FIG. 1) with a copy of the blockchain ledger 144. This allows the data stored in the block 212a-c to be accessible for inspection and verification at any time by any device with a copy of the blockchain ledger 144.

Referring back to FIG. 1, the blockchain network 140 is configured to establish consensus among the network nodes 142a-n about the present state of the blockchain ledger 144. For example, each network node 142a-n comprises a processor in signal communication with a memory storing software instructions that when executed by the processor, cause the network nodes 142a-n to implement a consensus protocol procedure through which all the network nodes 142a-n of the blockchain network 140 reach a common agreement about the present state of the blockchain ledger 144. In this way, each network node 142a-n achieves reliability in the blockchain network 140 and establishes trust between the network nodes 142a-n in a distributed computing environment. Essentially, the consensus protocol makes sure that every new block 212a-c (see FIG. 2) that is added to the blockchain 146 (see FIG. 2) is the one and only version of the truth that is agreed upon by all the block 212a-c (see FIG. 2) in the blockchain 146 (see FIG. 2).

Data Transfer Device

Data transfer device 150 generally includes a hardware computer system configured to implement a secure data transfer among entities 134 and avatars 104 within a virtual environment 130. In certain embodiments, the data transfer device 150 may be implemented by a cluster of computing devices, such as virtual machines. For example, the data transfer device 150 may be implemented by a plurality of computing devices using distributed computing and/or cloud computing systems in a network. In certain embodiments, the data transfer device 150 may be configured to provide services and resources (e.g., data and/or hardware resources) for the components of the system 100.

The data transfer device 150 comprises a processor 152 operably coupled with a network interface 154 and a memory 156. Processor 152 comprises one or more processors operably coupled to the memory 156. The processor 152 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 152 may be a programmable logic device, a microcontroller, a microprocessor, or any suitable number and combination of the preceding. The one or more processors are configured to process data and may be implemented in hardware or software. For example, the processor 152 may be 8-bit, 16-bit, 32-bit, 64-bit, or of any other suitable architecture. The processor 152 may include an arithmetic logic unit (ALU) for performing arithmetic and logic operations. The processor 152 may register the supply operands to the ALU and stores the results of ALU operations. The processor 152 may further include a control unit that fetches instructions from memory and executes them by directing the coordinated operations of the ALU, registers and other components. The one or more processors are configured to implement various software instructions. For example, the one or more processors are configured to execute instructions (e.g., software instructions 158) to perform the operations of the data transfer device 150 described herein. In this way, processor 152 may be a special-purpose computer designed to implement the functions disclosed herein. In an embodiment, the processor 152 is implemented using logic units, FPGAs, ASICs, DSPs, or any other suitable hardware. The processor 152 is configured to operate as described in FIGS. 1-4. For example, the processor 152 may be configured to perform one or more operations of method 400 as described in FIG. 4.

Network interface 154 is configured to enable wired and/or wireless communications. The network interface 154 may be configured to communicate data between the data transfer device 150 and other devices, systems, or domains of the system 100. For example, the network interface 154 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 152 may be configured to send and receive data using the network interface 154. The network interface 154 may be configured to use any suitable type of communication protocol.

The memory 156 may be volatile or non-volatile and may comprise read-only memory (ROM), random-access memory (RAM), ternary content-addressable memory (TCAM), dynamic random-access memory (DRAM), and static random-access memory (SRAM). The memory 156 may include one or more of a local database, cloud database, network-attached storage (NAS), etc. The memory 156 comprises one or more disks, tape drives, or solid-state drives, and may be used as an over-flow data storage device, to store programs when such programs are selected for execution, and to store instructions and data that are read during program execution. The memory 156 may store any of the information described in FIGS. 1-4 along with any other data, instructions, logic, rules, or code operable to implement the function(s) described herein when executed by processor 152. For example, the memory 156 may store software instructions 158, user profiles 162, requests 164, user input 168, image processing machine learning module 170, entity profile 172, virtual world information 174, real-world information 177, security token 180, a blockchain ledger 144, data transfer engine 160, and/or any other data or instructions. The software instructions 158 may comprise any suitable set of instructions, logic, rules, or code operable to execute the processor 152 and perform the functions described herein, such as some or all of those described in FIGS. 1-4.

The data transfer engine 160 may be implemented by the processor 152 executing the software instructions 158, and is generally configured to facilitate secure data transfer operations within the virtual environment 130. An example secure data transfer operation is described in FIG. 3.

The user profiles 162 may include profiles of users 102 who are members or clients of the organization 106. The user profile 162 associated with a user 102 may include user information and security token. The user information includes a name of the user 102, an address of the user 102, an identifier number associated with the user 102, and other information associated with the user 102. The security token may include a particular number. The security token may be used to authenticate the user information and ultimately the user 102. The user input 168 may include data that the user 102 provides to the computing device 120 for validating the identity of the user 102. For example, when the user 102 wants to transfer data to the entity 134, the user 102 may input user information to the computing device 120 by operating user interfaces of the computing device 120. The user 102 may also provide data object 166 to be transferred to the entity 134 to the computing device 120 by operating user interfaces of the computing device 120.

The image processing machine learning module 170 may be implemented by the processor 152 executing the software instructions 158, and is generally configured to extract information and features from images, such as images of the virtual data reader 132 for validating that the virtual data reader 132 is associated with the entity 134. In certain embodiments, the image processing machine learning module 170 may include a support vector machine, neural network, random forest, k-means clustering, Tree-based algorithm, Random Forest algorithm, etc. In certain embodiments, the image processing machine learning module 170 may include image processing, object recognition, video processing algorithms, and the like. The image processing machine learning module 170 may be implemented by supervised, semi-supervised, or unsupervised training algorithms. In a training stage, the image processing machine learning module 170 may be given a training dataset comprising images of virtual data readers each labeled with a respective entity 134, 138. The image processing machine learning module 170 may extract features from the images and learn to associate between each image and a respective entity 134, 138. The features may include text, symbols, logos, numbers, registration numbers, and characters that uniquely identify the respective entity 134, 138. In a testing stage, the image processing machine learning module 170 is given unlabeled images of virtual data readers and is asked to predict the entity 134, 138. In a refining stage and in backpropagation, the image processing machine learning module 170 may update the weight and bias values of the neural networks to increase the accuracy of the prediction of the image processing machine learning module 170.

The entity profiles 172 may include profiles of entities 134, 138. The entity profile 172 associated with an entity 134, 138 may include information associated with the entity 134, 138, such as a name, a symbol, a logo, a registration number, a serial number, a physical address, a virtual address, a location coordinate in real-world, a location coordinate in the virtual environment 130, etc.

The virtual world information 174 comprises user information 175 and environment information 176. The user information 175 generally comprises information that is associated with any accounts or profiles that can be used within a virtual environment 130. For example, user information 175 may comprise user profile information, online account information, avatar information, digital resources information, or any other suitable type of information that is associated with a user 102 and their avatar 104 within a virtual environment 130. The environment information 176 generally comprises information about the appearance of a virtual environment 130. For example, the environment information 176 may comprise information associated with objects, landmarks, buildings, structures, avatars, entity (e.g., entity 134), or any other suitable type of element that is present within a virtual environment 130. In some embodiments, the environment information 176 may be used to create a representation of a virtual environment 130 for users 102. In this case, a virtual environment 130 may be implemented using any suitable type of software framework or engine.

The real-world information 177 comprises user information 178 and environment information 179. The user information 178 generally comprises information that is associated with any accounts or profiles that can be used within the real world. For example, user information 178 may comprise user profile information, user profile 162, account information, real-world resource information, or any other suitable type of information that is associated with a user 102 within a real-world environment. The environment information 179 generally comprises information that is associated with an entity (e.g., organization) within the real world that the user 102 is a member of or is associated with. For example, the environment information 179 may comprise addresses, phone numbers, email addresses, contact names, or any other suitable type of information that is associated with an entity. Since the data transfer device 150 has access to both the virtual world information 174 and the real-world information 177, the data transfer device 150 is able to link together the virtual world information 174 and the real-world information 177 for a user 102 such that changes to the virtual world information 174 affect or propagate to the real-world information 177 and vice-versa. For example, the data transfer device 150 may be configured to store one or more maps (e.g., actions of an avatar 104, virtual interaction sessions 136, etc.) that translate or convert different types of interactions between the real world and the virtual environment 130 and vice-versa.

Operational Flow for a Secure Data Transfer in a Virtual Environment

Figure 3:
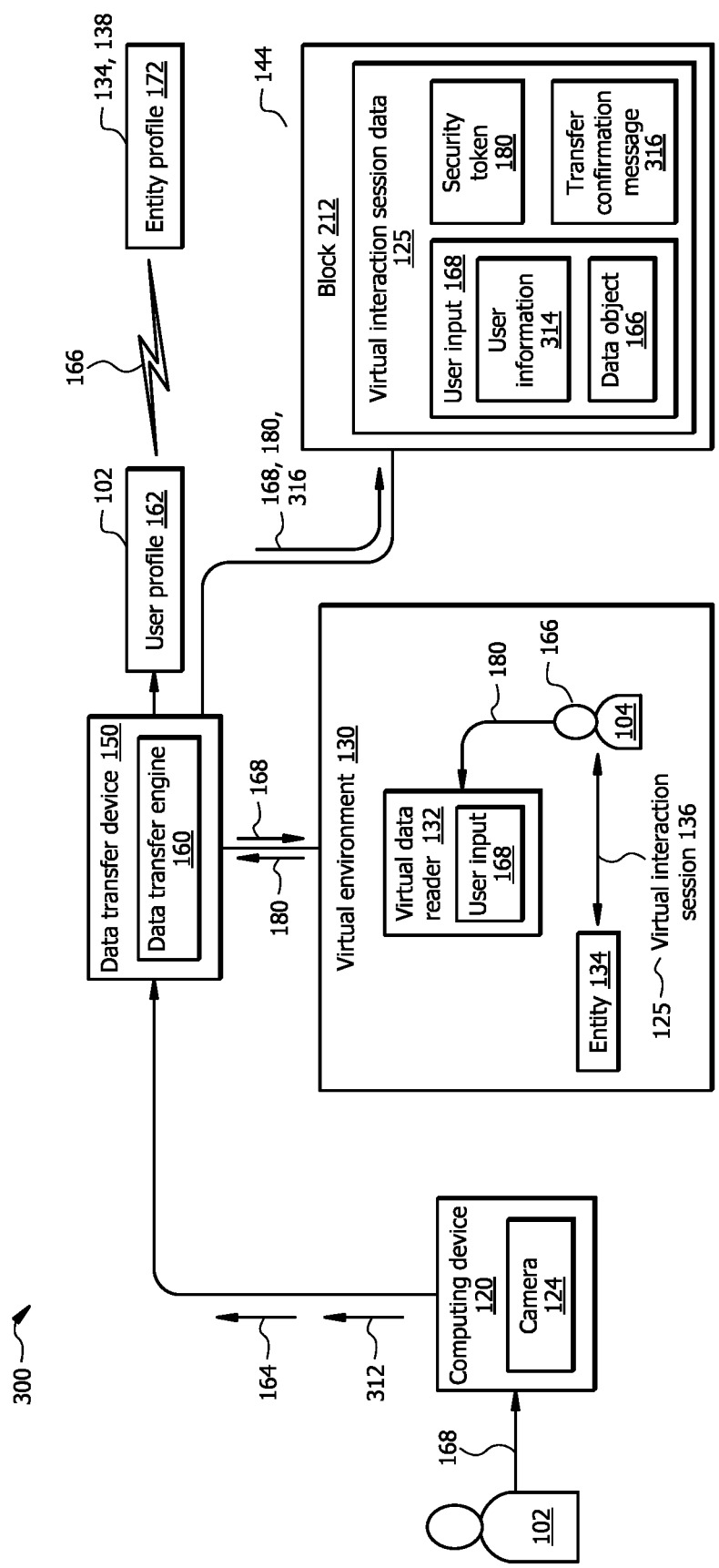
FIG. 3 illustrates an example operational flow of the system of FIG. 1.

FIG. 3 illustrates an example operational flow 300 of the system 100 (see FIG. 1) for implementing secure data transfer in a virtual environment 130. The operational flow 300 may begin when the user 102 operates the avatar 104 (using the computing device 120) to transfer a data object 166 to the entity 134. The data object 166 may include a virtual object (e.g., a virtual representation of a file, a virtual document, and the like), a virtual service, a virtual product, and the like. In certain embodiments, the data object 166 may be a virtual representation of a physical object (e.g., a file, a document, and the like), a service, a product, and the like. The data object 166 may occupy memory storage associated with the user 102. For example, the data object 166 may be stored in the user profile 162 associated with the user 102. The user 102 may transmit a request 164 to initiate a virtual interaction session 136 between the avatar 104 and the entity 134 to the data transfer device 150. In response, the data transfer device 150 may execute the data transfer engine 160 to conduct the virtual interaction session 136 and perform the secure data transfer from the avatar 104 to the entity 134. The data transfer device 150 may perform the operations below in response to executing the data transfer engine 160.

Receiving User Input for Data Transfer Operation

The data transfer device 150 may verify the identity of the user 102 and the user input 168 as described below. The data transfer device 150 may present a virtual data reader 132 to the avatar 104. The virtual data reader 132 may be a virtual representation of a physical data reader, such as a data scanner, a card scanner, a file scanner, a document scanner, and the like. The virtual data reader 132 may include a screen that displays data, e.g., such as a file, a document, etc. The user 102 can view the data displayed on the virtual data reader 132 via the display screen of the computing device 120.

The user 102 may provide user input 168 to the computing device 120. The user input 168 may include user information 314 and data object 166 to be transferred to the entity 134. The user information 314 may include a name, an identifier number, a date, etc. The user 102 may enter an identifying name (e.g., a file name) and/or a number (how many instances of the data object 166). For example, the user 102 may provide the user input 168 using user interfaces of the computing device 120, such as a touch screen, a keypad, a camera, and the like. In another example, the user 102 may use the user interfaces of the computing device 120 to scan or capture an image of a file or document that includes the user information 314 and/or the data object 166 using the camera 124.

The computing device 120 transfers the user input 168 to the data transfer device 150. The data transfer device 150 receives the user input 168 and transfer it to the virtual data reader 132. The data transfer device 150 may facilitate displaying the user input 168 on a display screen of the virtual data reader 132. Thus, the user 102 may view the user input 168 on the display screen of the virtual data reader 132. The user 102 may confirm that the user input 168 that they provide to the computing device 120 is transmitted correctly to the virtual data reader 132 by manually checking the user input 168 displayed on the virtual data reader 132.

Now that the user input 168 is available on the virtual data reader 132, the user 102 may operate the avatar 104 to input a security token 180 to the virtual data reader 132. For example, the user 102 may operate the avatar 104 to input the security token 180 into a user interface of the virtual data reader 132, such as a keypad, a touch screen, and the like. The security token 180 may be associated with the user information 314 provided by the user 102 in the user input 168. The security token 180 may be used for authentication of the user information 314 and ultimately the user 102. When the security token 180 is entered to the virtual data reader 132, the virtual data reader 132 may communicate the security token 180 to the data transfer device 150 for validation and authentication of the user information 314 provided by the user 102 in the user input 168.

Verifying the Entity

In certain embodiments, the data transfer device 150 may be configured to verify the entity 134. For example, upon the presentation of the virtual data reader 132, the data transfer device 150 may verify the entity 134. In this process, the data transfer device 150 may perform the operations below. The data transfer device 150 may capture an image/a video of the virtual data reader 132. The virtual data reader 132 may be associated with the entity 134. The data transfer device 150 may verify whether the virtual data reader 132 belongs to the entity 134. For example, the data transfer device 150 may implement an image processing machine learning module 170 to extract information and features from the image of the virtual data reader 132.

The data transfer device 150 may receive the image of the virtual data reader 132 that is included in the entity data 312 from the computing device 120. For example, in response to receiving the request 164, the data transfer device 150 may trigger the camera 124 to capture an image of the virtual data reader 132 and include it in the entity data 312. In another example, in response to sending the request 164, the virtual data reader 132 may be presented to the avatar 104. The user 102 may view the virtual data reader 132 presented to the avatar 104 and manually capture an image of the virtual data reader 132 using the camera 124. The computing device 120 may transmit the entity data 312 to the data transfer device 150. In another example, the entity 134 may transmit the image of the virtual data reader 132 to the data transfer device 150. The entity 134 may be operated by an operator who is a member of the entity 134, 138. The image of the virtual data reader 132 may show a name of the entity 134, registration information of the entity 134, a serial number associated with the entity 134, and the like. The entity data 312 may also include an identifier associated with the entity 134 (e.g., a name), and other information associated with the entity 134.

The data transfer device 150 extracts features from the image of the virtual data reader 132 using the image processing machine learning module 170. For example, the features may include objects, shapes, text, numbers, logos, symbols, and the like displayed on the image of the virtual data reader 132. In the same or another example, the features may include a name of the entity 134, registration information of the entity 134, a serial number associated with the entity 134, and the like. The features may be represented by a vector of numerical values. The vector may be the embedding output vector of the image processing machine learning module 170.

The data transfer device 150 may use the extracted features to verify that the virtual data reader 134 belongs to the entity 134. To this end, the data transfer device 150 may compare the extracted features of the image of the virtual data reader 132 with previously provided feature information associated with the entity 134 stored in the entity profile 172.

Although for validating the entity 134, a particular embodiment where an image of the virtual data reader 132 is described to be used, the present disclosure contemplated other embodiments. In certain embodiments, any information associated with the entity 134 may be used for validating the entity 134. For example, the entity 134 may present or communicate a name of the entity 134, a registration number of the entity 134, a serial number of the entity 134, a location of the entity 134, etc. to the avatar 104. The user 102 may communicate the received information to the data transfer device 150 in the entity data 312 for validation by comparing with entity profile 172. If a matching entity profile 172 is found that include the received information, the data transfer device 150 may determine that the virtual data reader 132 belongs to the entity 134 and that entity 134 is authenticated to participate in the virtual interaction session 136.

In the same or another example, the entity 134 may present or communicate information about the entity 138 (e.g., a name, registration number, a location, a serial number, etc.) to the avatar 104. The 102 may communicate the received information to the data transfer device 150 in the entity data 312 for validation by comparing with entity profile 172, similar to that described above. The data transfer device 150 may use the information associated with the entity 138 to determine that the entity 134 and entity 138 are associated with the same organization, and validate their identity.

In certain embodiments, any of the information associated with the entity 134 and/or entity 138 may be transmitted to the data transfer device 150 in a file, a document, an image, or any suitable data format.

In certain embodiments, the entity 134 may communicate the information associated with the entity 134 and/or entity 138 (e.g., in the entity data 312) to the data transfer device 150 directly (e.g., via a computing device associated with the entity 134 and/or entity 138). For example, an operator who manages the operations of the entity 134 in the virtual environment 130 may communicate the information associated with the entity 134 and/or entity 138 (e.g., in the entity data 312) to the data transfer device 150 via the computing device.

In certain embodiments, the entity 134 may communicate the information associated with the entity 134 and/or entity 138 (e.g., in the entity data 312) to the computing device 120. The computing device 120 may forward the received information to the data transfer device 150 for verification. In certain embodiments, the data transfer device 150 may verify the entity 134 before or after verifying the identity of the user 102 and the user input 168.

Authenticating the User Information and the Security Token

The data transfer device 150 uses the user input 168 provided by the user 102 in the real world and the security token 180 provided by the avatar 104 in the virtual environment 130 for authentication and validation of the user information 314 provided by the user 102. The data transfer device 150 may also use the user input 168 and the security token 180 to verify the identity of the user 102 to provide a secure data transfer from the avatar 104 to the entity 134.

In authentication of the user input 168, the data transfer device 150 may verify if the user input 168 belongs to the user 102. In this operation, the data transfer device 150 may search in user profiles 162 using the user information provided by the user 102 in the user input 168. For example, the data transfer device 150 may search for a name that the user 102 provided in the user input 168. The data transfer device 150 may search for a matching user profile 162 that includes matching user information as the user information 314 that the user 102 provided in the user input 168. For example, the data transfer device 150 may compare the user information 314 with the use information previously stored in each user profile 162. If a matching user profile 162 is found, the data transfer device 150 may determine that the user information 314 corresponds to the user information that is previously stored in the matching user profile 162. In response, the data transfer device 150 may validate the identity of the user 102 and determine that the user input 168 belongs to the user 102.

In a similar manner, the data transfer device 150 may verify the security token 180 by searching for a matching security token that is previously stored in the user profile 162 associated with the user 102. For example, the data transfer device 150 may search in the user profile 162 associated with the user 102 to find a previously stored security token. The data transfer device 150 may compare the security token 180 provided by the avatar 104 with the previously stored security token in the user profile 162. If it is determined that the security token 180 provided by the avatar 104 corresponds to (or matches with) the previously stored security token. the data transfer device 150 determines that the security token 180 is valid and authenticated.

In response to determining that the user input 168 belongs to the user 102 and that the security token 180 is valid, the data transfer device 150 may transfer the data object 166 to the entity 134. In this process, the data transfer device 150 may transfer the data object 166 from memory storage (e.g., user profile 162) associated with the user 102 to a memory storage associated with the entity 134, 138 (e.g., the entity profile 172). This data transfer may reflect in the real world and the entity profile 172 associated with the entity 138 may be updated to include the transferred data object 166. Upon successfully transfer of the data object 166, the data transfer device 150 may conclude the virtual interaction session 136.

Distributing Data Transfer Information in a Blockchain

In certain embodiments, the data transfer device 150 may store virtual interaction session data 215 associated with the virtual interaction session 136 in the blockchain ledger 144 in one or more blocks 212. The virtual interaction session data 215 may include the user input 168, security token 180, transfer confirmation message 316, and/or any other data associated with the virtual interaction session 136. In this process, the data transfer device 150 may communicate the user input 168 to the blockchain network 140 as a first blockchain data entry 216 to be stored in the blockchain ledger 144. The data transfer device 150 may also communicate the security token 180 to the blockchain network 140 as a second blockchain data entry 216 to be stored in the blockchain ledger 144.

In response to transferring the data object 166 to the entity 134, the data transfer device 150 may communicate a transfer confirmation message 316 to the virtual data reader 132, such that the transfer confirmation message 316 is displayed on a display screen of the virtual data reader 132. The user 102 may view the transfer confirmation message 316.

In certain embodiments, the user 102 may accept the transfer confirmation message 316, e.g., by e-signing or pressing a button on the virtual data reader 132 or the computing device 120. The data transfer device 150 may also communicate the transfer confirmation message 316 to the blockchain network 140 as a third blockchain data entry 216 to be stored in the blockchain ledger 144. In certain embodiments, each blockchain data entry 216 may be stored in a different block 212. In certain embodiments, blockchain data entries 216 related to the virtual interaction session 136 may be stored in the one block 212 in the virtual interaction session data 215.

The data transfer device 150 may use the blockchain data entries 216 for authentication of further data transfer requests and operations by the user 102. The blockchain data entries 216 may be non-fungible tokens that cannot be altered. For future data transfer operations, the data transfer device 150 may use the previously stored blockchain data entries 216 for authentication of the parties in the data transfer operation and other data associated with the data transfer operation.

Example Method for Provisioning Secure Data Transfer in Virtual Environments

Figure 4:
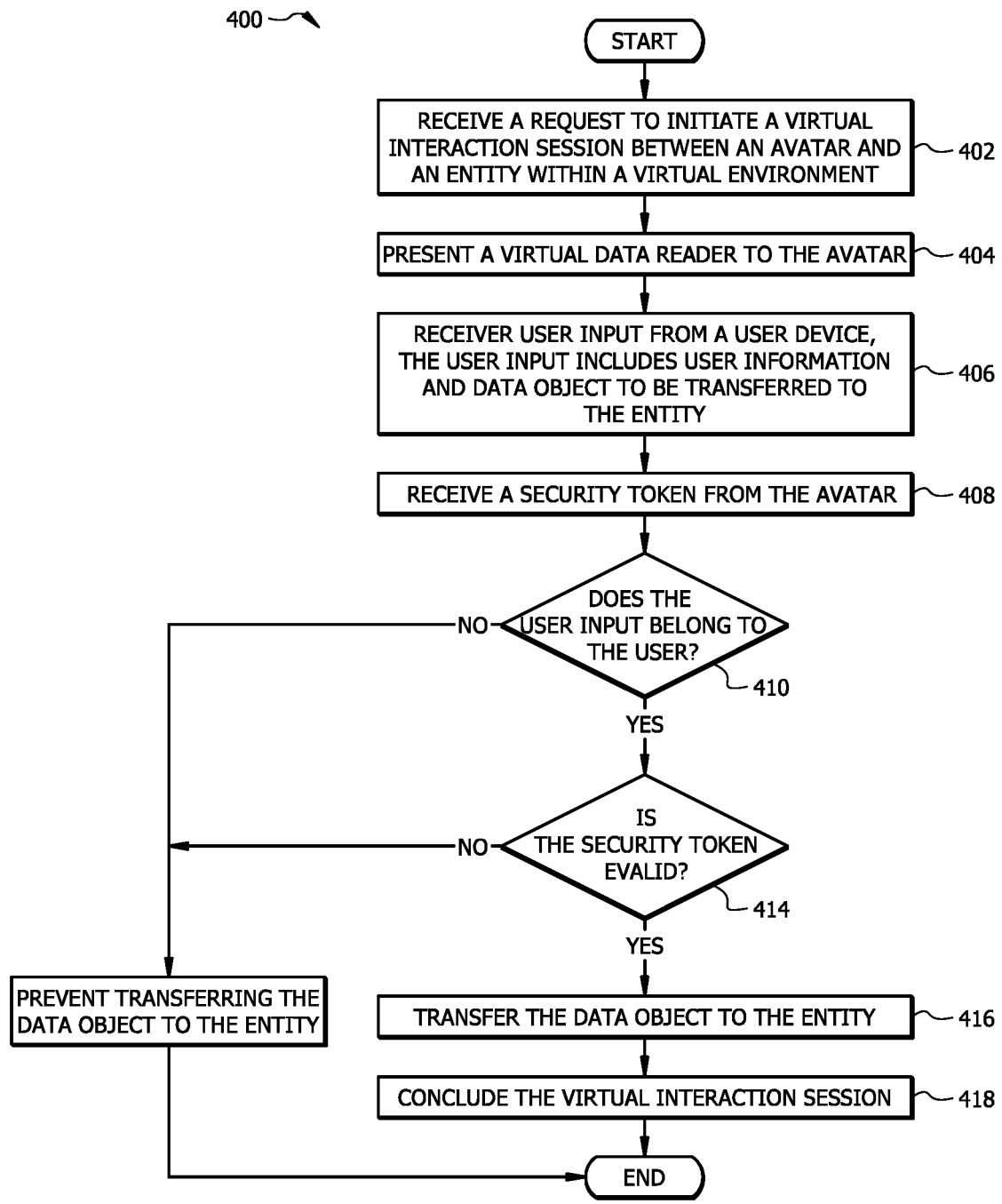
FIG. 4 illustrates an example flowchart of a method for provisioning secure data transfer in virtual environments.

FIG. 4 illustrates an example flowchart of a method 400 for secure data transfer in virtual environments 130. Modifications, additions, or omissions may be made to method 400. Method 400 may include more, fewer, or other operations. For example, operations may be performed in parallel or in any suitable order. While at times discussed as the system 100, data transfer device 150, computing device 120, or components of any of thereof performing operations, any suitable system or components of the system may perform one or more operations of the method 400. For example, one or more operations of method 400 may be implemented, at least in part, in the form of software instructions 158 of FIG. 1, stored on non-transitory, tangible, machine-readable media (e.g., memory 156 of FIG. 1) that when run by one or more processors (e.g., processor 152 of FIG. 1) may cause the one or more processors to perform operations 402-418.

At operation 402, the data transfer device 150 receives a request 164 to initiate a virtual interaction session 136 between the avatar 104 and the entity 134 in the virtual environment 130. In this process, the user 102 may transmit the request 164 to the data transfer device 150 via the computing device 120.

At operation 404, the data transfer device 150 presents the virtual data reader 132 to the avatar 104. The data transfer device 150 may validate that the virtual data reader 132 belongs to the entity 134 and that the entity 134 is authenticated, similar to that described in FIG. 3.

At operation 406, the data transfer device 150 receives user input 168 from the user device 120, the user input 168 includes user information 314 and data object 166 to be transferred to the entity 134. For example, the user 102 may provide the user input 168 to the user device 120 using user interfaces, similar to that described in FIG. 3. The user device 120 may forward the user input 168 to the data transfer device 150.

At operation 408, the data transfer device 150 receives a security token 180 from the avatar 104. For example, the user 102 may operate the avatar 104 to enter the security token 180 into a user interface (e.g., keypad) of the virtual data reader 132. The virtual data reader 132 may transfer the security token 180 to the data transfer device 150.

At operation 410, the data transfer device 150 determines if the user input 168 belongs to the user 102. In this process, the data transfer device 150 may verify the identity of the user 102 and that if the user input 168 belongs to the user 102 by searching for a matching user profile 162 that is associated with the user 102, similar to that described in FIG. 3. If it is determined that the user input 168 belongs to the user 102, method 400 proceeds to operation 414. Otherwise, method 400 proceeds to operation 412.

At operation 412, the data transfer device 150 prevents transferring the data object 166 to the entity 134. At operation 414, the data transfer device 150 determines if the security token 180 is valid. In this process, the data transfer device 150 may determine if the user profile 162 associated with the user 102 stores a matching or corresponding security token, similar to that described in FIG. 3. If it is determined that the security token 180 is valid, method 400 proceeds to operation 416. Otherwise, method 400 proceeds to operation 412.

At operation 416, the data transfer device 150 transfers the data object 166 to the entity 134. For example, the data transfer device 150 may transfer the data object 166 from the user profile 162 to the entity profile 172. At operation 418, the data transfer device 150 concludes the virtual interaction session 136.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for secure data transfer in a virtual environment, comprising:
   a memory configured to store a user profile associated with a user, wherein the user profile comprises:
      first user information comprising at least one of a first name and a first identifier number; and
      a first security token that is used to authenticate the first user information;
   a processor operably coupled to the memory, and configured to:
      receive a request to initiate a virtual interaction session between an avatar and an entity within a virtual environment, wherein the avatar is operated by the user using a user device;
      present a virtual data reader to the avatar, wherein the virtual data reader comprises a screen to display data;
      receive user input from the user device, wherein:
         the user input comprises second user information and data object to be transferred to the entity;
         the second user information comprises at least one of a second name and a second identifier number;
         the user input is transferred from the user device to the virtual data reader;
      receive a second security token from the avatar;
      verify that the user input belongs to the user;
      verify that the second security token is valid;
      in response to determining that the user input belongs to the user and that the second security token is valid:
         transfer the data object to the entity; and
         conclude the virtual interaction session.

2. The system of claim 1, wherein transferring the data object to the entity comprises transferring the data object from first memory storage associated with the user to second memory storage associated with the entity.

3. The system of claim 1, wherein the second security token is entered by the avatar on a keypad on the virtual data reader.

4. The system of claim 1, wherein the processor is further configured to display the user input on a display screen of the virtual data reader.

5. The system of claim 1, wherein verifying that the user input belongs to the user comprises:
   comparing the first user information with the second user information; and
   determining that the first user information corresponds to the second user information.

6. The system of claim 1, wherein verifying that the second security token is valid comprises:
   comparing the second security token with the first security token; and
   determining that the second security token corresponds to the first security token.

7. The system of claim 1, wherein the processor is further configured to:
   communicate the user input to a blockchain network as a first blockchain data entry to be stored in a database distributed among a plurality of network nodes in the blockchain network; and
   communicate the second security token to the blockchain network as a second blockchain data entry to be stored in the distributed database.

8. A method for secure data transfer in a virtual environment, comprising:
   storing a user profile associated with a user, wherein the user profile comprises:
      first user information comprising at least one of a first name and a first identifier number; and a first security token that is used to authenticate the first user information;
receiving a request to initiate a virtual interaction session between an avatar and an entity within a virtual environment, wherein the avatar is operated by the user using a user device;
presenting a virtual data reader to the avatar, wherein the virtual data reader comprises a screen to display data;
receiving user input from the user device, wherein:
the user input comprises second user information and data object to be transferred to the entity;
the second user information comprises at least one of a second name and a second identifier number;
the user input is transferred from the user device to the virtual data reader;
receiving a second security token from the avatar;
verifying that the user input belongs to the user;
verifying that the second security token is valid;
in response to determining that the user input belongs to the user and that the second security token is valid:
transferring the data object to the entity; and
concluding the virtual interaction session.

9. The method of claim 8, wherein transferring the data object to the entity comprises transferring the data object from first memory storage associated with the user to second memory storage associated with the entity.

10. The method of claim 8, wherein the second security token is entered by the avatar on a keypad on the virtual data reader.

11. The method of claim 8, further comprising displaying the user input on a display screen of the virtual data reader.

12. The method of claim 8, wherein verifying that the user input belongs to the user comprises:
comparing the first user information with the second user information; and
determining that the first user information corresponds to the second user information.

13. The method of claim 8, wherein verifying that the second security token is valid comprises:
comparing the second security token with the first security token; and
determining that the second security token corresponds to the first security token.

14. The method of claim 8, further comprising:
communicating the user input to a blockchain network as a first blockchain data entry to be stored in a database distributed among a plurality of network nodes in the blockchain network; and
communicating the second security token to the blockchain network as a second blockchain data entry to be stored in the distributed database.

15. A non-transitory computer-readable medium that stores instructions, wherein when the instructions are executed by one or more processors, cause the one or more processors to:
store a user profile associated with a user, wherein the user profile comprises:
first user information comprising at least one of a first name and a second identifier number; and
a first security token that is used to authenticate the first user information;
receive a request to initiate a virtual interaction session between an avatar and an entity within a virtual environment, wherein the avatar is operated by the user using a user device;
present a virtual data reader to the avatar, wherein the virtual data reader comprises a screen to display data;
receive a user input from the user device, wherein:
the user input comprises second user information and data object to be transferred to the entity;
the second user information comprises at least one of a second name and a second identifier number;
the user input is transferred from the user device to the virtual data reader;
receive a second security token from the avatar;
verify that the user input belongs to the user;
verify that the second security token is valid;
in response to determining that the user input belongs to the user and that the second security token is valid:
transfer the data object to the entity; and
conclude the virtual interaction session.

16. The non-transitory computer-readable medium of claim 15, wherein transferring the data object to the entity comprises transferring the data object from first memory storage associated with the user to second memory storage associated with the entity.

17. The non-transitory computer-readable medium of claim 15, wherein the second security token is entered by the avatar on a keypad on the virtual data reader.

18. The non-transitory computer-readable medium of claim 15, wherein the instructions when executed by the one or more processors, further cause the one or more processors to display the user input on a display screen of the virtual data reader.

19. The non-transitory computer-readable medium of claim 15, wherein the instructions when executed by the one or more processors, further cause the one or more processors to:
communicate the user input to a blockchain network as a first blockchain data entry to be stored in a database distributed among a plurality of network nodes in the blockchain network; and
communicate the second security token to the blockchain network as a second blockchain data entry to be stored in the distributed database.

20. The non-transitory computer-readable medium of claim 19, wherein the instructions when executed by the one or more processors, further cause the one or more processors in response to transferring the data object to the entity, to:
communicate a transfer confirmation message to the virtual data reader, such that the transfer confirmation message is displayed on a display screen of the virtual data reader; and
communicate the transfer confirmation message to the blockchain network as a third blockchain data entry to be stored in the distributed database.

* * * * *